Sept. 29, 1959     H. J. LUEHRS     2,906,204
GRIPPER ASSEMBLIES
Filed June 24, 1957
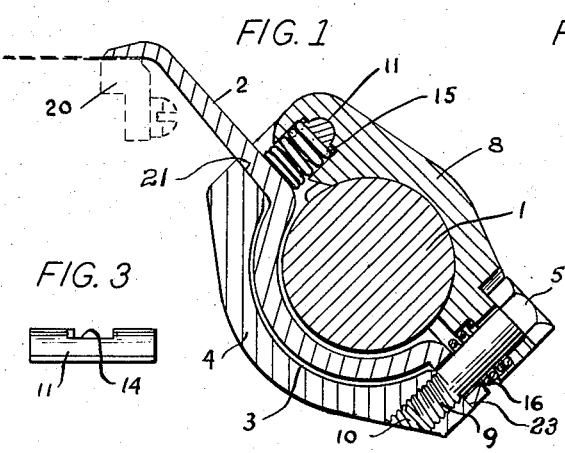
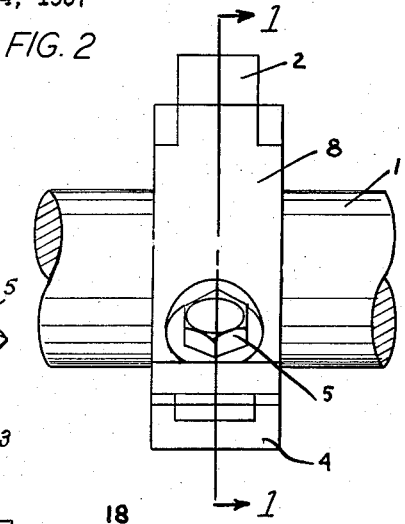
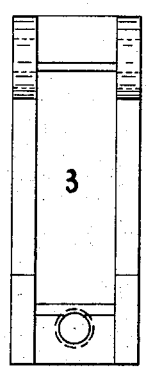
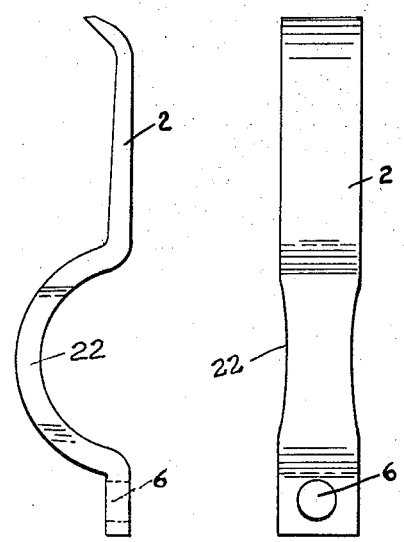
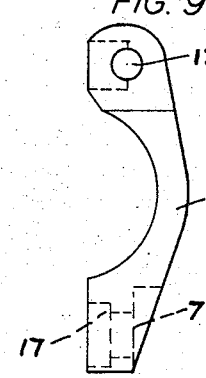
INVENTOR.
HANS J LUEHRS United States Patent Office 2,906,204
Patented Sept. 29, 1959

2,906,204
GRIPPER ASSEMBLIES

Hans J. Luehrs, Westerly, R.I., assignor to The Cottrell Company, Westerly, R.I., a corporation of Delaware Application June 24, 1957, Serial No. 667,531

10 Claims. (Cl. 101—409)

This invention is directed to improvements in gripper assemblies used to control the sheets in a rotary printing press in which my novel assembly is normally fixed on a gripper shaft for use in conjunction with other similar assemblies mounted thereon. Each gripper assembly constructed according to my invention is adjustable on the gripper shaft either circumferentially or longitudinally and is readily removable without disturbing the gripper shaft or adjacent assemblies during such adjustment or removal.

The object of my invention is to provide a gripper assembly in which a gripper finger is resiliently mounted in a composite mounting and so secured therein as to allow and maintain a self adjusting pressure and a self adjusting squaring alignment of said gripper finger in respect to its gripper pad.

Another object of my invention is to provide a gripper assembly of the character described, in which the gripper finger is floatingly mounted so as to largely eliminate the high friction of starting, inherently present on conventional spring yielding and shaft pivoting gripper assemblies, at the critical moment when the grippers pivot successively while contacting at high speed for their bite to take the sheet.

Another object is to provide a gripper assembly in which the gripper finger is so mounted and shaped that the deflection of the springs or the deflection of the gripper will not cause the latter to scuff on its pad in opposite direction of sheet travel, as is the case with conventional forged one-piece grippers, which tend to scuff and thereby dislocate sheets while taking the latter at high speed.

A further object is to provide an assembly by which the above and other objects may effectively be attained as will more fully appear from the following detail description.

Broadly my invention comprises the combination with a printing press gripper shaft of at least two or more gripper assemblies adjustably and removably mounted thereon, its mounting comprising separable members encompassing the shaft, a gripper finger resiliently mounted in said mounting and means for securing said finger therein and said mounting to the shaft.

Practical embodiments of my invention are illustrated in the accompanying drawing in which:

Fig. 1 represents a transverse vertical section of an assembly according to my invention, taken on the line I—I of Fig. 2 looking in the direction of the arrows;

Fig. 2 represents a back view of a gripper assembly mounted on a gripper shaft;

Fig. 3 represents a pin element of the assembly showing a cut out portion for purposes to be described;

Fig. 4 represents, in side elevation, one of the separable mounting members adapted to receive a gripper finger.

Fig. 5 represents a back view (looking from the right of Fig. 4) of the element shown in Fig. 4;

Fig. 6 represents an end elevation, partly broken away, of a modified form of my invention mounted on the gripper shaft;

Fig. 7 represents, in side elevation, the gripper finger;

Fig. 8 represents a back view of the gripper shown in Fig. 7;

Fig. 9 represents, in side elevation, the second, or other, member of the separable mounting; and Fig. 10 represents a back view of the member shown in Fig. 9.

Referring to the drawing, in which each part bears the same numeral throughout the several views, the gripper shaft is denoted by 1 and is normally mounted at its ends so as to be rockable, such mounting not being illustrated herein as it does not constitute part of the present invention and is well known in the art.

A gripper finger 2 is received in a channel 3 in member 4 of the gripper mounting so as to be movable around a fulcrum at 23 as the contact pressure overcomes the force of spring 15. Furthermore, gripper 2 has a slightly thinner width at 22 to allow for a self-aligning movement of the gripper across its pad. The floating gripper, therefore, is only held against the longitudinal displacement in said channel 3 by means of a screw bolt 5 passed through bore 6 in finger 2, said bolt having been introduced through bore 7 in another member 8 of said separable mounting and having its threaded end 9 removably engaged by the tapped section 10 in member 4.

The separable members 4 and 8 are normally hinged together by a recessed pin, denoted by 11, located in bores 12 and 13 of said members and held therein in any well known or approved manner, it being understood that these bores 12 and 13 are properly alined to receive pin 11 when the mounting is assembled.

As clearly illustrated in Fig. 3, the pin 11 is cut out or recessed at 14 to receive a coil spring 15, one end of said spring being seated in the recess 14 and the other end of said spring 15 being adapted to press against the back of gripper finger 2 so as to normally hold said finger against surface 21 in member 4 when assembly is in open position.

A similar spring 16 is illustrated in Fig. 1, said spring being mounted with one end in a recess 17 in the lower end of member 8, and the other end abutting the lower back end of gripper finger 2, thereby urging same against surface 23 of member 4 as described above with reference to spring 15. The spring 16 is so shaped and located as to surround the stem of bolt 5. Its function is to maintain the aforementioned fulcrum of the gripper finger 2 under action.

In the modified form of my invention shown in Fig. 6, the two springs 15 and 16 are replaced by suitably shaped pieces of synthetic rubber or other resilient material denoted by the numerals 18 and 19. These pieces act in the same manner as the springs 15, 16, against the gripper finger 2, urging same against surfaces 21 and 23, from which it can be seen that the said finger is resiliently mounted, i.e., "floating" in both forms of the invention illustrated in the drawing.

To mount the assembly on the gripper shaft 1, the members 4 and 8 of the separable mounting are swung apart on the pin 11 and the shaft 1 inserted between said members which are then drawn together to encompass the shaft by setting up on the screw bolt 5 which engages members 4 and 8, gripper finger 2 and spring 16 as above set forth and thus removably and adjustably secure the entire assembly to the shaft. It will be understood that the members 4 and 8 may be swung apart far enough to go over the shaft 1 if it is desired to assemble same thereon in that manner or if it becomes necessary or desirable to remove an assembly from the shaft.

The element 20 shown in dotted lines in Fig. 1, illustrates a conventional gripper pad against which the gripper finger operates to hold the sheet when the gripper shaft 1 is rocked to the position shown in said Fig. 1 by any well known or approved means (not shown).

In order to adjust the assembly either along or around shaft 1, it is only necessary to back off bolt 5, move the assembly in the desired direction to the adjusted position and then tighten up the bolt to draw members 4 and 8 against the shaft. Either adjustment or removal is feasible without disturbing the shaft or other assemblies thereon.

As clearly appears from the foregoing description, the gripper finger 2 is normally out of contact with shaft 1 and is "floatingly" or resiliently mounted. No strain on the gripper is directly transmitted to the shaft and each gripper finger is capable of a certain amount of self adjustment to accommodate different conditions of stress arising from varying thickness of stock being handled or other conditions affecting the rocking of said shaft.

It will be understood that any desired number of assemblies may be mounted on a common gripper shaft and that each may be separately adjusted thereon, thereby, in conjunction with the self adjustment described above, practically eliminating the necessity for pre-loading the gripper shaft at its ends by the large springs now customary to ensure a secure grip at each finger against the sheet and the respective gripper pad.

The shape of the gripper finger 2, as illustrated in Figs. 1 and 7, is of importance in giving the requisite strength and action to each finger as the design and manner of securing same in its mounting distribute the operational stress along the finger rather than concentrate same at any particular point.

It will also be noted that in the form illustrated in Fig. 6, the cut out in pin 11 is not required and the recess 17 in element 8 may be eliminated.

Since it is evident that various changes may be made in the construction, form and arrangement of the several parts without departing from the spirit and scope of my invention, I do not intend to be limited to the specific embodiments herein shown and described except as set forth in the appended claims.

What I claim is:

1. The combination with a printing press gripper shaft of a gripper assembly mounted thereon, said assembly comprising a separable mounting including two coacting members surrounding the shaft and hinged together at one end of said mounting, a floating gripper finger resiliently mounted between said members on both sides of said shaft, and a common means at the other end of said mounting for yieldingly securing the gripper finger in the mounting and the latter to said gripper shaft.

2. A structure according to claim 1, including a plurality of gripper assemblies in which each assembly is independently and removably held on said gripper shaft.

3. A structure according to claim 1, in which said assembly is laterally and circumferentially adjustable on said gripper shaft.

4. A structure according to claim 1, in which separate resilient means are located in opposite ends of said mounting for biasing said gripper finger in said mounting in lateral and radial direction with respect to the gripper shaft.

5. A structure according to claim 1, in which the mounting includes a spring, a hinge pin having an intermediate cutout adapted to receive one end of the spring, the other end of said spring contacting the gripper finger intermediate its ends.

6. A structure according to claim 1, in which the hinged mounting includes a spring, a hinge pin having an intermediate cutout portion adapted to receive one end of the spring, the other end of said spring contacting the gripper finger, and a second spring surrounding the common means for securing the gripper finger in the mounting and the latter to said gripper shaft, said springs biasing the said gripper finger in said hinged mounting.

7. A structure according to claim 1, in which one member of the hinged mounting is provided with an arcuate longitudinal channel adapted to receive a substantial portion of the gripper finger therein.

8. The combination with a printing press gripper shaft of a gripper assembly mounted thereon, said assembly comprising a separable mounting including two members hinged together and surrounding the shaft, a floating gripper finger, means for resiliently mounting said finger in said mounting, and a common means for securing the gripper finger in the mounting and the latter to said shaft, said means for mounting said finger comprising two resilient spacers between the gripper finger and said separable mounting.

9. A structure according to claim 8 in which the gripper finger is provided with an arcuate mid-section, one of the separable mounting members has an arcuate channel, said arcuate mid-section of the gripper finger being received therein, alined bores in the gripper finger and mounting members, and the common means for securing the gripper finger to its mounting and the latter to the shaft is received in said bores.

10. A structure according to claim 8, including at least one gripper pad, in which the parts are so constructed and arranged that the floating gripper finger is movable with respect to its mounting to match the upper plane surface of its gripper pad.

References Cited in the file of this patent

UNITED STATES PATENTS

| | | |
|---|---|---|
| 1,123,619 | Story | Jan. 5, 1915 |
| 1,483,057 | Warsen | Feb. 5, 1924 |
| 1,848,629 | Herbst | Mar. 8, 1932 |
| 1,895,124 | Crafts et al. | Jan. 24, 1933 |
| 2,418,065 | Bobst | Mar. 25, 1947 |

FOREIGN PATENTS

| | | |
|---|---|---|
| 25,880 | Great Britain | July 9, 1914 |